United States Patent
Gastaldi

(10) Patent No.: US 12,404,802 B2
(45) Date of Patent: Sep. 2, 2025

(54) COMBUSTION CHAMBER FOR HIGH PERFORMANCE H2 DIRECT INJECTION ENGINE

(71) Applicant: SAUDI ARABIAN OIL COMPANY, Dhahran (SA)

(72) Inventor: Patrick Gastaldi, Rueil-Malmaison (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/299,802

(22) Filed: Apr. 13, 2023

(65) Prior Publication Data

US 2024/0344479 A1    Oct. 17, 2024

(51) Int. Cl.
*F02B 43/12* (2006.01)
*F02B 23/10* (2006.01)
*F02B 75/12* (2006.01)

(52) U.S. Cl.
CPC .......... *F02B 43/12* (2013.01); *F02B 23/101* (2013.01); *F02B 2023/102* (2013.01); *F02B 2075/125* (2013.01)

(58) Field of Classification Search
CPC ................ F02B 23/101; F02B 43/12
See application file for complete search history.

(56) References Cited

U.S. PATENT DOCUMENTS

| | | | | |
|---|---|---|---|---|
| 4,329,949 A | * | 5/1982 | Abts | ......................... F02F 1/38 123/90.34 |
| 5,645,023 A | * | 7/1997 | Regueiro | .................. F01L 1/14 123/90.22 |
| 6,260,518 B1 | | 7/2001 | Jingu | |
| 6,947,830 B1 | * | 9/2005 | Froloff | ................ F02D 41/3076 701/111 |

(Continued)

FOREIGN PATENT DOCUMENTS

EP    1207285 A1    5/2002
JP    2017072031 A    4/2017

(Continued)

OTHER PUBLICATIONS

International Search Report issued in corresponding International Application No. PCT/US2024/026295; mailed Sep. 11, 2024 (6 pages).

(Continued)

*Primary Examiner* — Hai H Huynh
*Assistant Examiner* — Johnny H Hoang
(74) *Attorney, Agent, or Firm* — Osha Bergman Watanabe & Burton LLP

(57) ABSTRACT

A hydrogen direct injection engine includes a cylinder and a combustion chamber positioned at a center of the cylinder, where an axis of the combustion chamber is approximately identical to an axis of the cylinder. The hydrogen direct injection engine also includes one or more intake valves positioned around the cylinder, one or more exhaust valves positioned around the cylinder, a cylinder head mounted (Continued)

across a top surface of the cylinder, and a fuel injector positioned vertically at the center of the cylinder. The hydrogen direct injection engine further includes a piston disposed within the cylinder, and a spark plug positioned between the one or more intake valves.

18 Claims, 5 Drawing Sheets

(56) References Cited

U.S. PATENT DOCUMENTS

| | | | | |
|---|---|---|---|---|
| 6,951,193 | B1* | 10/2005 | Draper | F01P 1/02 |
| | | | | 123/41.17 |
| 7,526,944 | B2 | 5/2009 | Sabata et al. | |
| 11,306,648 | B1* | 4/2022 | Zhang | F02B 19/10 |
| 11,359,537 | B1* | 6/2022 | Gastaldi | F02F 1/40 |
| 11,378,042 | B1* | 7/2022 | Johnson | F02P 3/02 |
| 2001/0003281 | A1* | 6/2001 | Mori | F02F 1/242 |
| | | | | 123/305 |
| 2006/0137642 | A1 | 6/2006 | Artmann et al. | |
| 2010/0183993 | A1* | 7/2010 | McAlister | F02D 41/401 |
| | | | | 123/41.31 |
| 2011/0048374 | A1* | 3/2011 | McAlister | F02M 57/06 |
| | | | | 123/436 |
| 2016/0356211 | A1* | 12/2016 | Wicks | F02D 41/0007 |
| 2017/0101923 | A1* | 4/2017 | Loetz | F02B 19/12 |
| 2018/0283235 | A1* | 10/2018 | Dalmas, II | F01M 11/0408 |
| 2018/0283264 | A1* | 10/2018 | Dalmas, II | F02F 3/28 |
| 2018/0283265 | A1* | 10/2018 | Dalmas, II | F01L 1/185 |
| 2018/0283311 | A1* | 10/2018 | Dalmas, II | F02B 33/30 |
| 2018/0283312 | A1* | 10/2018 | Dalmas, II | F02B 33/04 |
| 2020/0018254 | A1* | 1/2020 | Wicks | F02F 1/40 |
| 2020/0056535 | A1* | 2/2020 | Bouvy | F02B 47/02 |
| 2020/0173392 | A1* | 6/2020 | Brack | F02B 23/0642 |
| 2023/0100541 | A1* | 3/2023 | Browne | F02M 61/14 |
| | | | | 123/1 A |

FOREIGN PATENT DOCUMENTS

| | | |
|---|---|---|
| WO | 9625592 A1 | 8/1996 |
| WO | 1998053190 A1 | 11/1998 |
| WO | 2000017505 A1 | 3/2000 |
| WO | 2008041241 A2 | 4/2008 |
| WO | 2022199841 A1 | 9/2022 |

OTHER PUBLICATIONS

Written Opinion of the International Searching Authority issued in corresponding International Application No. PCT/US2024/026295; dated Sep. 11, 2024 (8 pages).

* cited by examiner

COMBUSTION CHAMBER FOR HIGH PERFORMANCE H2 DIRECT INJECTION ENGINE

BACKGROUND

Spark ignition engines generally use a pent roof combustion chamber, allowing larger valves than those typically used with a flat cylinder head. Diesel engines, in comparison, typically use a much stiffer flat cylinder head due to the higher peak pressures within the cylinder. Both geometries are able to be used for gas and hydrogen engines. In particular, a flat cylinder head offers the potential for higher combustion peak pressures when high performances are targeted. In such engines, it can be difficult to appropriately locate the fuel injector and the spark plug, which are preferably positioned in the center of the cylinder, without reducing the diameter of the intake and exhaust valves.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a hydrogen direct injection engine. The hydrogen direct injection engine may include a cylinder and a combustion chamber positioned at a center of the cylinder, where an axis of the combustion chamber is approximately identical to an axis of the cylinder. The hydrogen direct injection engine may also include one or more intake valves positioned around the cylinder, one or more exhaust valves positioned around the cylinder, a cylinder head mounted across a top surface of the cylinder, and a fuel injector positioned vertically at the center of the cylinder. The hydrogen direct injection engine may further include a piston disposed within the cylinder, and a spark plug positioned between the one or more intake valves.

In another aspect, embodiments disclosed herein relate to a method. The method may include providing a hydrogen direct injection engine, where the hydrogen direct injection engine comprises a cylinder, a flat cylinder head sealing the cylinder, a combustion chamber positioned at a center of the cylinder between one or more intake valves and one or more exhaust valves, a fuel injector positioned at the center of the combustion chamber, and a spark plug flush mounted in the flat cylinder head. The method may also include injecting, during a compression stroke of the hydrogen direct injection engine, a volume of hydrogen into the combustion chamber using the fuel injector after a closure of an intake valve. The method may further include mixing a mixture of the volume of hydrogen and air within the combustion chamber and igniting the mixture using the spark plug.

Other aspects and advantages of the claimed subject matter will be apparent from the following description and the appended claims.

BRIEF DESCRIPTION OF DRAWINGS

Specific embodiments of the disclosed technology will be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
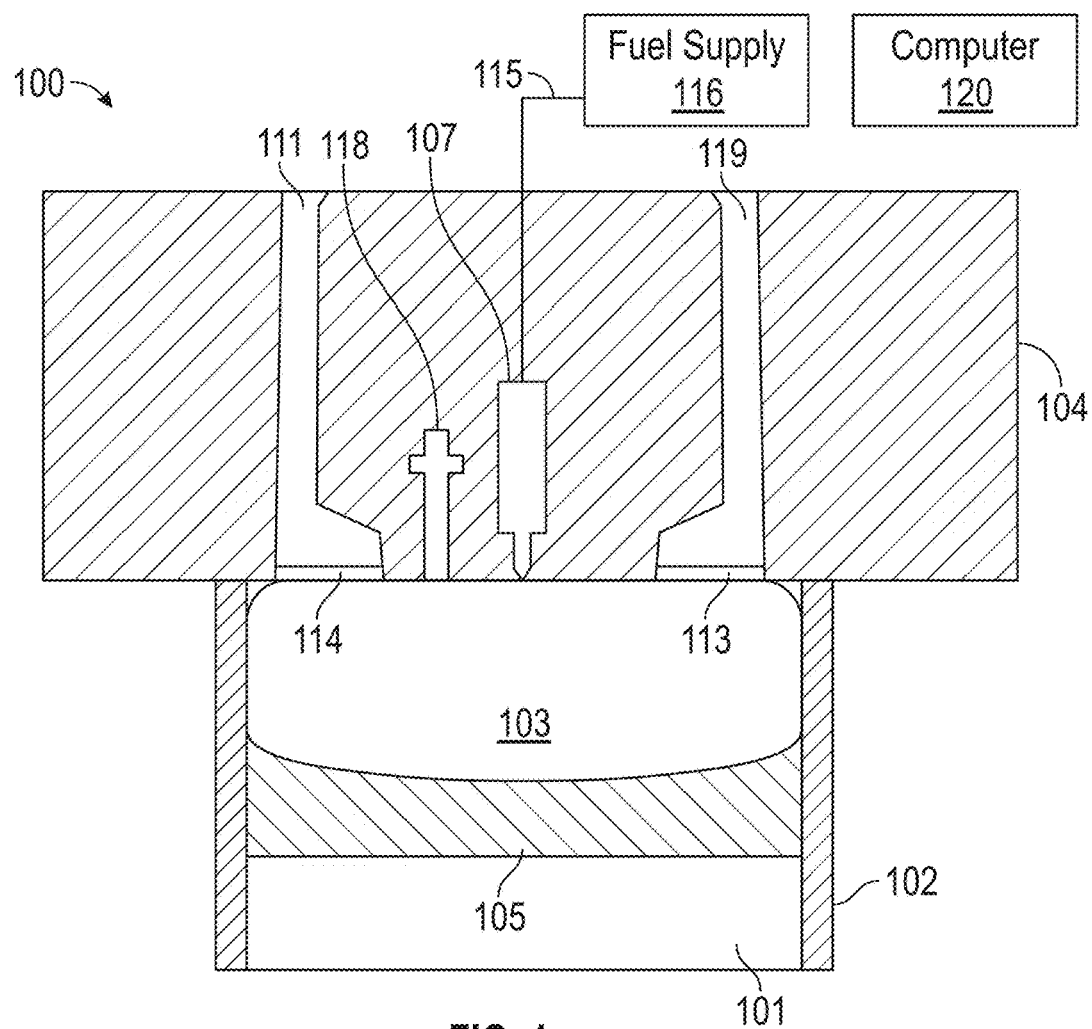
FIG. 1 shows a hydrogen direct injection engine in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a fracture" includes reference to one or more of such fractures.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims. Similarly, various features that are described in the context of a single embodiment (i.e., in combination) can be excised from the combination and may be directed to a sub-combination or variation of sub-combination.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a hydrogen direct injection engine configured to use hydrogen as a fuel. In particular, embodiments disclosed herein relate to a hydrogen direct injection engine including a flat cylinder head and a domed combustion chamber configured to allow appropriate placement of a fuel injector and a spark plug in a center region about a central axis of the combustion cylinder without requiring smaller intake and exhaust valves.

FIG. 1 shows a hydrogen direct injection engine 100, referred to as simply an "engine" throughout this application, in accordance with one or more embodiments. The engine 100 may include a cylinder 101 within an engine block 102. In FIG. 1, only a portion of the engine block 102 is shown, and only one cylinder 101 in the engine block 102 is shown, although an engine block 102 may have several cylinders. The cylinder 101 may include a combustion chamber 103 of the engine 100. In accordance with one or more embodiments, the combustion chamber 103 may be dome-shaped, where the combustion chamber 103 cross-section is approximately equal or slightly less than the cross-section of the cylinder 101. Additionally, a cylinder head 104 may be mounted at a top of the cylinder 101 and forms an upper end of the combustion chamber 103. In one or more embodiments, the cylinder head 104 may be flat. For example, in the embodiment shown, the cylinder head 104 has a flat surface interfacing the combustion chamber 103, where the flat surface may extend across the entire diameter of the combustion chamber. In one or more embodiments, as described in more detail below, the cylinder head may have a domed portion of the combustion chamber formed therein, extending inward from the flat surface, where the domed portion of the combustion chamber may be positioned along a central axis of the cylinder. In one or more embodiments, the volume of the combustion chamber 103 may be greater than 50% of the dead volume of the cylinder head 104.

A piston 105 may be arranged inside the cylinder 101 and forms a lower end of the combustion chamber 103. In one or more embodiments, the piston 105 may have a recessed head. The piston 105 moves up and down inside the cylinder 101 during an engine cycle, and the volume of the combustion chamber 103 changes with the position of the piston 105. Further, the piston 105 may be connected to a crankshaft (not shown) by a connecting rod. The crankshaft may convert the reciprocating motion of the piston 105 into rotary motion, as is well known in the art.

A fuel injector 107 according to embodiments of the present disclosure may be mounted in the cylinder head 104. A clamp (not pictured) may removably fix the fuel injector 107 to the cylinder head 104. The clamp may be disposed on a top of the fuel injector 107 and be attached to the cylinder head 104 to maintain a position of the fuel injector 107. The fuel injector 107 may be in fluid communication with the combustion chamber 103. A spark plug 118 may be connected to and configured to interface with the combustion chamber 103. The spark plug 118 may be used to ignite fuel within the combustion chamber 103. In one or more embodiments, the spark plug 118 may be flush mounted in the cylinder head 104, such that one or more electrodes (not pictured) of the spark plug 118 do not protrude into the combustion chamber 103.

As shown, the cylinder head 104 may include at least one intake passage 119, which may fluidly communicate with the combustion chamber 103 via an intake valve 113. Further, the cylinder head 104 may include at least one exhaust passage 111 fluidly connected to the combustion chamber 103 via an exhaust valve 114. Although not shown, the combustion chamber 103 and the intake passage 119 may be connected to a source of air in a conventional manner. The air in the combustion chamber 103 and the intake passage 119 may be ambient air or a mixture of ambient air and recirculated exhaust gases. When the exhaust valve 114 is open, exhaust gases can be pushed out of the combustion chamber 103 into the exhaust passage 111. An intake passage 119, an exhaust passage 111 and associated components (e.g., valves 113, 114 and fuel injector 107) may be provided in the cylinder head 104 for each cylinder in the engine 100, such as in the arrangement shown in FIG. 1 for the cylinder 101.

In one or more embodiments, the fuel injector 107 may be used to directly inject fuel into the combustion chamber 103. The fuel injector 107 may be fluidly connected to a fuel line 115, which is in communication with a fuel supply 116.

In one or more embodiments, a computer 120 may include a control system, such as an engine control unit, which may control an opening and closing of the fuel injector 107 to deliver the fuel into the combustion chamber 103 at desired times during an engine cycle. The control system may also control opening and closing of the intake and exhaust valves 113, 114. The control system may further control the ignition timing of the engine (e.g., ignition timing of the spark plug 118 ignition based on the position of the piston, crankshaft, and/or intake/exhaust valves). In one or more embodiments, the computer 120 may include a processor and a user interface panel at which a user may provide an input, such as a command, to the computer 120.

In some embodiments, a cable (not shown), such as an electrical cable, may be coupled to the fuel injector 107. The cable may provide power to the fuel injector 107 from a power source (not shown). Additionally, the cable may be connected to the computer 120 to control the fuel injector 107. In one or more embodiments, the spark plug 118 may also be connected to the power source and computer to power and control timing of spark generation. The computer 120 may include instructions or commands to operate the fuel injector 107 and/or spark plug 118 automatically or a user may manually control the computer 120 at a user interface panel (not shown). It is further envisioned that the computer 120 may be connected to an office via a satellite such that a user may remotely monitor conditions and send commands to the fuel injector 107. If leaks and performance issues are found, an alert may be sent to the control system to adjust or turn off the fuel injector 107 manually or automatically.

Figure 6:
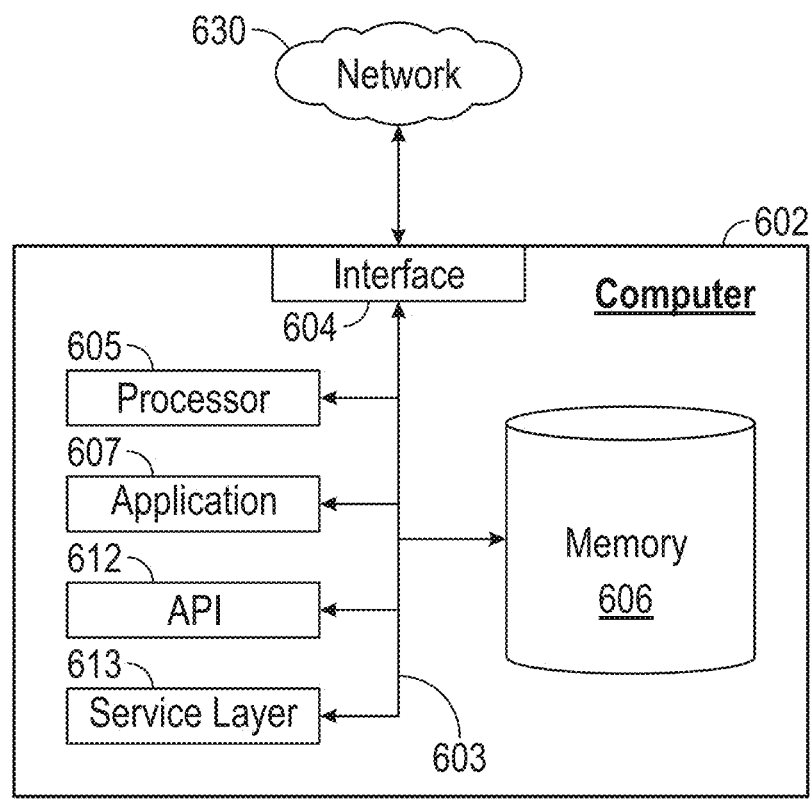
FIG. 6 shows a computer system in accordance with one or more embodiments.

The computer 120 may be, for example, a computer system 602. FIG. 6 depicts a block diagram of a computer system 602 used to provide computational functionalities associated with described algorithms, methods, functions, processes, flows, and procedures as described in this disclosure, according to one or more embodiments. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may include a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or another suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or interface's hardware is operable to communicate physical signals within and outside of the illustrated computer 602.

The computer 602 includes at least one computer processor 605. Although illustrated as a single computer processor 605 in FIG. 6, two or more processors may be used according to particular needs, desires, or particular implementations of the computer 602. Generally, the computer processor 605 executes instructions and manipulates data to perform the operations of the computer 602 and any machine learning networks, algorithms, methods, functions, processes, flows, and procedures as described in the instant disclosure.

The computer 602 also includes a memory 606 that holds data for the computer 602 or other components (or a combination of both) that can be connected to the network 630. For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system containing a computer 602, wherein each computer 602 communicates over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Figure 2:
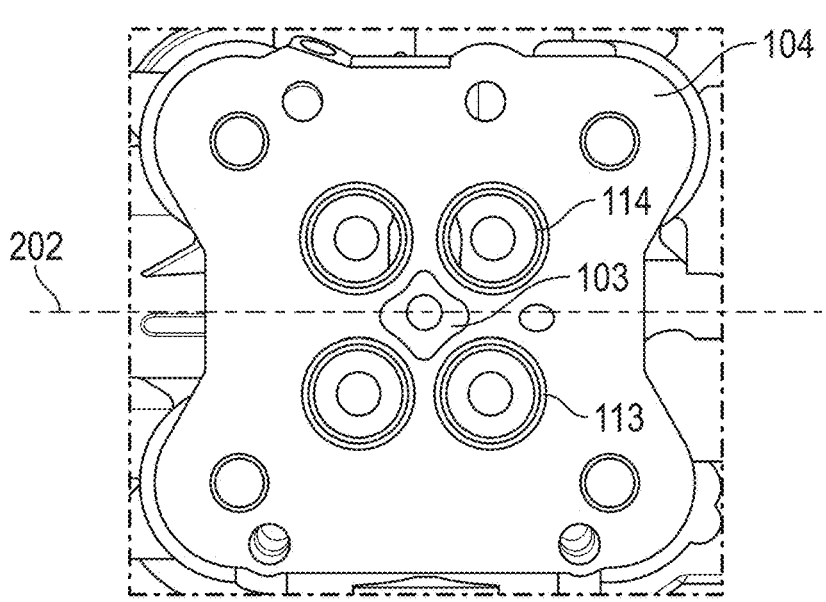
FIG. 2 shows a cylinder head in accordance with one or more embodiments.

Turning now to FIG. 2, FIG. 2 shows a cylinder head 104 in accordance with one or more embodiments. In one or more embodiments, the cylinder head 104 may be flat, with a domed portion of the combustion chamber 103 located centrally along a flat surface of the cylinder head 104. Particularly, FIG. 2 shows an elevated view looking toward the flat surface of the cylinder head 104. When the cylinder head 104 is mounted on a cylinder, the flat surface interfaces with an adjacent cylinder chamber. One or more intake valves 113 and one or more exhaust valves 114 may be arranged around the domed portion of the combustion chamber 103, with the intake valves 113 and the exhaust valves 114 arranged parallel to one another about an axis 202.

Figure 3:
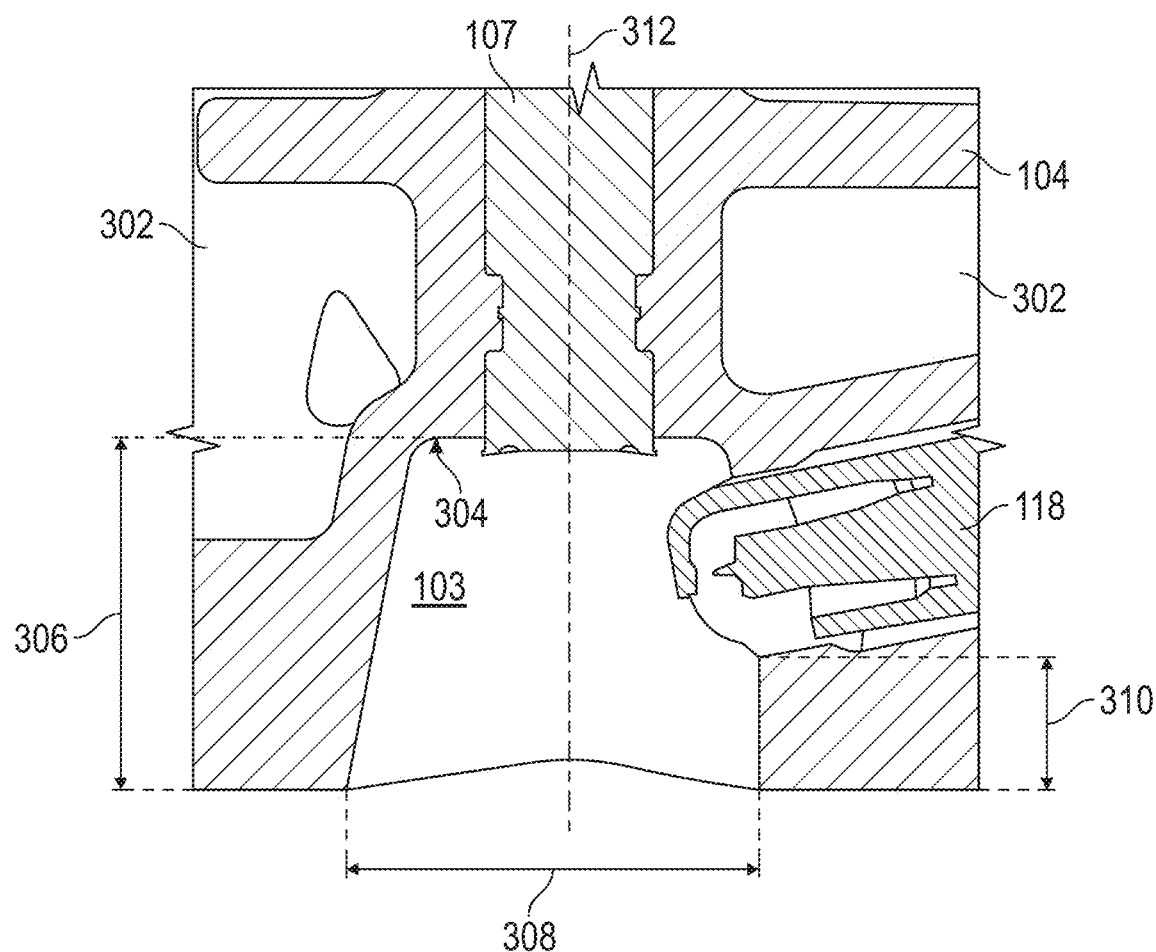
FIG. 3 shows a hydrogen direct injection engine in accordance with one or more embodiments.

FIG. 3 shows a cylinder head 104 of a hydrogen direct injection engine 100 in accordance with one or more embodiments. The domed portion of the combustion chamber 103 may be centrally located within the cylinder head 104, with a central axis 312 of the combustion chamber 103 being approximately identical to the central axis of the cylinder 101. The fuel injector 107 may be positioned vertically at or approximately along the central axis of the cylinder 101. Specifically, the fuel injector 107 may be positioned in a recess in the cylinder head 104, such that an injection tip of the fuel injector 107 interfaces with the domed portion of the combustion chamber 103.

Figure 8:
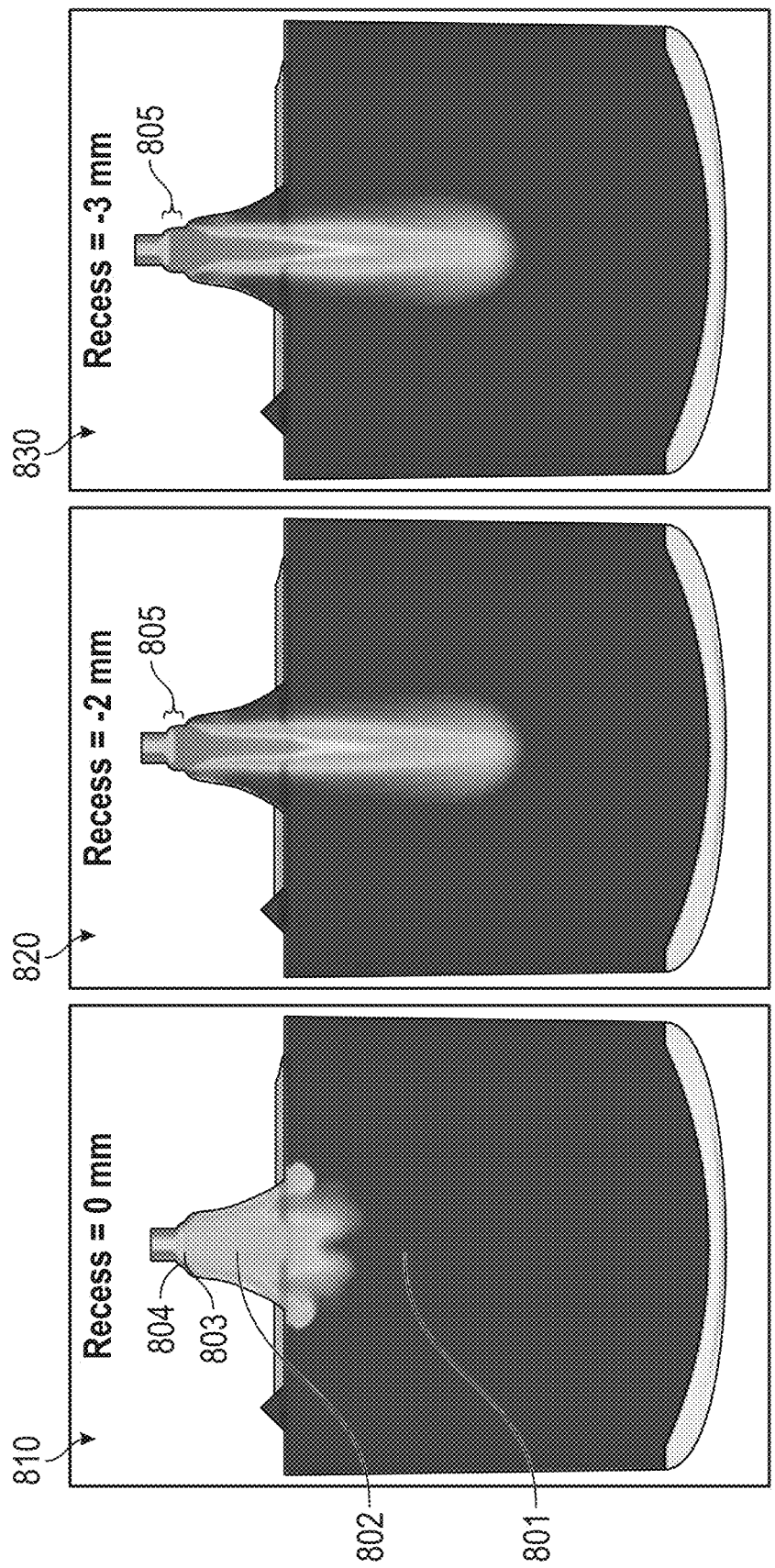
FIG. 8 shows examples of combustion chamber profiles with different fuel injector recession depths in an engine according to embodiments of the present disclosure.

In one or more embodiments, the tip of the fuel injector 107 may be recessed from an upper surface of the dome portion by a depth between 1 mm and 3 mm. For example, FIG. 8 shows examples of different combustion chamber profiles in an engine according to embodiments of the present disclosure. The combustion chamber profiles include a main combustion chamber 801 formed in the cylinder and a domed portion 802 of the combustion chamber formed in the cylinder head. An injection tip 803 of a fuel injector interfaces with the domed portion 802 along an upper surface 804 of the domed portion 802. In a first configuration 810, the injection tip 803 is positioned in-line, or flush, with the upper surface 804 of the domed portion 802 of the combustion chamber. In a second configuration 820, the injection tip 803 is recessed a depth 805 of 2 mm from the upper surface 804 of the domed portion 802 of the combustion chamber. In a third configuration 830, the injection tip 803 is recessed a depth 805 of 3 mm from the upper surface 804 of the domed portion 802 of the combustion chamber. As shown by the examples of the different recessed configurations, positioning the fuel injector in a recessed position from a domed portion of a combustion chamber may result in improved fuel jetting. When the tip of the fuel injector 107 is recessed, the jet flow may not be as attracted to the wall of the combustion chamber 103 (as according to the Coanda effect) and gas penetration is much improved. This may facilitate better mixing of the fuel with ambient air. In one or more embodiments, a fuel injector may be positioned axially within a fuel injector receptor at a selected axial position to position the injection tip of the fuel injector at a selected recess depth from the upper surface of the domed portion.

The spark plug 118, in accordance with one or more embodiments, may be positioned between the intake valves 113 to assist with cooling. The design of the spark plug 118 shown in FIG. 3 is not intended to be limiting. Other shapes or other configurations of electrode protrusions, such as surface or semi-surface electrodes, may be used without departing from the scope of this disclosure. The electrodes of the spark plug 118 may be located close to the wall of the domed portion of the combustion chamber 103 to promote cooling. In some embodiments, the ignition end of the spark plug may be flush with or recessed from the wall of the domed portion of the combustion chamber. The cylinder head 104 may be designed such that two or more water jackets 302 are located proximate the spark plug 118 and in the vicinity of the tip of the fuel injector 107.

The domed portion of the combustion chamber 103 may be dome-shaped, with rounded upper corners. Each upper corner may have a radius of curvature 304. In one or more embodiments, the radius of curvature 304 may be around 2 mm, which may allow for an acceptable thermomechanical stress and a close vicinity between the spark plug 118 and the fuel injector 107. The domed portion of the combustion chamber 103 may have a height 306, measured as an axial distance between the fire deck and the upper surface of the domed portion, and a cross-section 308. In one or more embodiments, the fire deck may refer to the lower surface of the cylinder head 104. As described herein, the fire deck, or lower surface, of the cylinder head 104 may be a flat surface. The cross-section 308 may be defined as the intersection of the combustion chamber 103 and the cylinder head 104 fire deck. The height 306 and the cross-section 308 may be selected in order to optimize the global compression ratio of the engine 100, which may range between 9 and 13. The height 306 may be selected according to mechanical strength criteria and may be roughly independent of the engine bore size (the inner diameter of the cylinder). Further, the ratio between the cross-section 308 and the engine bore size may range between 3 and 4 (e.g., 3.5). For example, in some embodiments, the height 306 may be approximately 20 mm and the cross-section 308 may be approximately 25 mm.

In one or more embodiments, the domed portion of the combustion chamber also has an upper cross-section measured between the side walls of the domed portion proximate the upper surface of the domed portion and parallel with the cross-section 308. In one or more embodiments, the upper cross-section may be equal to or slightly less than the cross-section 308, e.g., up to 10 percent less than the cross-section 308.

Distance 310 may refer to the smallest possible distance between the fire deck and the spark plug 118. In one or more embodiments, distance 310 may be selected according to mechanical strength criteria. For example, in some embodiments, distance 310 may be approximately 6 mm.

Figure 4:
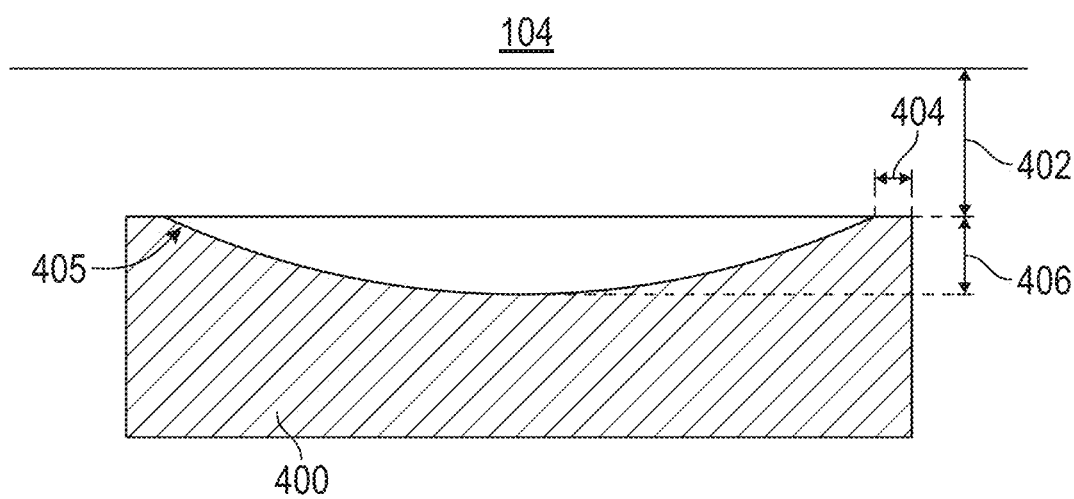
FIG. 4 shows a recessed piston head disposed in a combustion chamber in accordance with one or more embodiments.

Each piston 105 may include a piston head, which may have a recessed area and may be composed of a material such as aluminum or steel. FIG. 4 shows a recessed piston head 400 disposed in a combustion chamber in accordance with one or more embodiment. In one or more embodiments, the piston head 400 may be recessed across the entire top surface, where the recess is uniform in shape. However, there are other embodiments, such as that shown in FIG. 5, where the piston head 502 has a recess 504 which is non-uniform and non-symmetrical in shape. In the embodiment shown in FIG. 5, the piston head 502 may be rotationally oriented in a cylinder such that the portion with a smaller volume recess area 506 aligns with an exhaust side of the piston head (e.g., closer to exhaust valves interfacing the cylinder), and the portion with a larger volume recess area 508 aligns with an intake side of the piston head (e.g., closer to intake valves interfacing the cylinder).

Turning back to FIG. 4, the recess of the piston may have a radius of curvature 405 and a recess depth 406. In one or more embodiments, the radius of curvature 405 may be approximately 5 mm to avoid any hot spots on the surface of the piston head 400. The recess depth 406 may be selected according to a chosen compression ratio. In one or more embodiments, the recess depth 406 may range between 5 mm and 10 mm. The shallow shape of the piston may allow for the flame within the cylinder 101 to freely propagate towards the wall of the cylinder 101, while limiting wall heat losses. The squish height 402 may refer to the distance between the piston 105 and the cylinder head 104 fire deck when the piston 105 is at a top dead center (TDC) position. In one or more embodiments, the squish height 402 may be between 2 mm and 3 mm, which is significantly higher than the squish height of conventional SI engines. A larger squish height 402 may avoid pre-ignition or knock with hydrogen.

The squish width 404 may refer to a portion of the piston head which is parallel to the flat surface of the cylinder head 104. In one or more embodiments, the squish width 404 may range from 2 to 4 mm (e.g., approximately 3 mm) and may be selected as the minimum value which may secure the desired thermomechanical stress.

Figure 5:
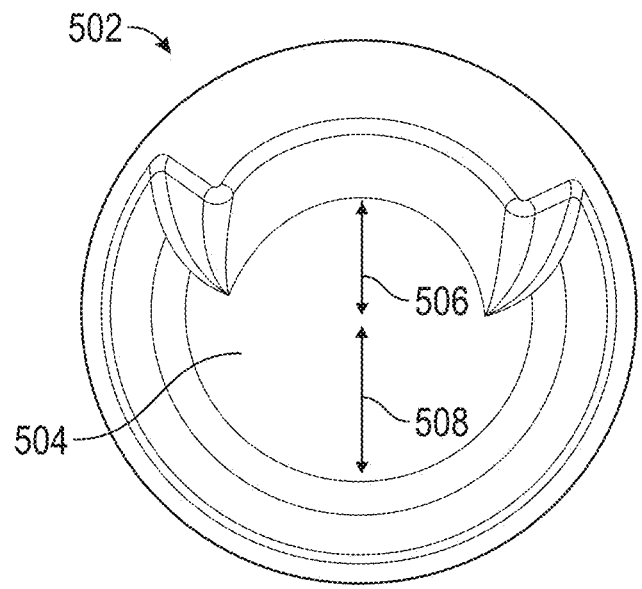
FIG. 5 shows a recessed piston head in accordance with one or more embodiments.

In one or more embodiments, cylinder heads 104 having a domed portion of a combustion chamber 103 formed therein, such as shown in FIG. 3, may be used in combination with a cylinder 101 having a recessed piston head, such as shown in FIG. 4 or in FIG. 5.

Figure 7:
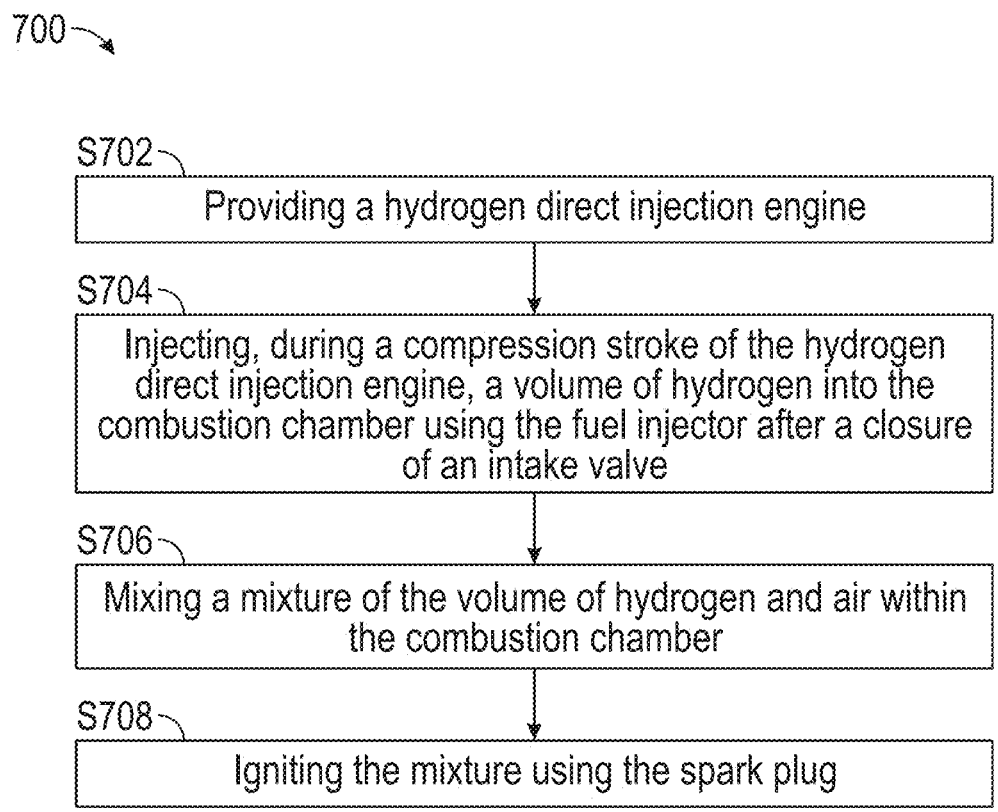
FIG. 7 shows a flowchart of a method in accordance with one or more embodiments.

FIG. 7 depicts a flowchart in accordance with one or more embodiments. More specifically, FIG. 7 depicts a flowchart 700 of a method of calculating an average total organic carbon value corresponding to the net source rock thickness. Further, one or more blocks in FIG. 7 may be performed by one or more components as described in FIGS. 1-6. While the various blocks in FIG. 7 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a hydrogen direct injection engine 100 may be provided, S702. The hydrogen direct injection engine 100 may be operated in a similar manner to a conventional single injection engine in terms of operating point (torque and speed) and tuning, with an optimization of the injection and ignition timing. The optimization procedure may differ for hydrogen direct injection engines 100 due to the properties of the hydrogen-air mixture. For example, the ignition may occur later in the cycle, and combustion may be more sensitive to pre-ignition necessitating a good mixture homogeneity and a good cooling of the combustion chamber 103.

The engine 100 may include a cylinder 101, a flat cylinder head 104 sealing the cylinder 101, and a combustion chamber 103 positioned centrally in the cylinder 101. A domed portion of the combustion chamber 103 formed in the cylinder head 104, in accordance with one or more embodiments, may be positioned between one or more intake valves 113 and one or more exhaust valves 114. The engine 100 may also include a fuel injector 107 positioned along a central axis of the combustion chamber 103 and a spark plug 118 flush mounted in the flat cylinder head 104.

During a compression stroke of the engine 100, a volume of hydrogen may be injected into the combustion chamber 103 using the fuel injector 107, S704. In one or more embodiments, injection of the volume of hydrogen may occur after the intake valve 113 has closed. After injection, the volume of hydrogen may be mixed with air within the combustion chamber 103 to form a mixture, S706. The mixture may then be ignited using the spark plug 118, S708.

In one or more embodiments, movement of the recessed piston head 400 through the combustion chamber 103 may induce free propagation of the flame produced by the spark plug 118 towards the wall of the cylinder 101. This may limit heat losses from the wall of the cylinder 101.

In one or more embodiments, a second volume of hydrogen may be injected into the combustion chamber 103 during an intake stroke of the engine 100. Specifically, the second injection may occur when the intake valve 113 lift is at a maximum. This may enhance mixing between the hydrogen and the ambient air in the combustion chamber 103 by taking advantage of the high air velocities which are inherent at maximum intake valve 113 lift.

Embodiments of the present disclosure may provide at least one of the following advantages. While conventional single injection combustion systems are generally used for hydrogen, these conventional systems take poor advantage of the very high flame velocity and the wide range of ignitability in terms of air/fuel ratio, for both lean and rich mixtures. Due to geometric constraints, the spark plug is typically located far from the tip of the injector, leading to a high air/fuel dispersion at the ignition timing in the vicinity of the spark plug. Further, conventional systems rely on high air motion generated by the intake passages, with high wall losses and a sensitivity to industrial dispersion.

In contrast, the present invention does not rely on any bulk air motion, instead relying on injection strategy to sufficiently mix the air fuel mixture within the combustion chamber. The intake passages and valves may therefore be selected to maximize air mass flow into the combustion chamber, which may maximize engine performance. The present invention also allows for both the fuel injector and the spark plug to be located in the center of the cylinder, reducing the time for the flame front to reach the cylinder wall. Further, the positioning of the fuel injector and the spark plug in the center of the cylinder does not require reducing the diameters of either the intake valves or the exhaust valves. Given the close vicinity of the injector tip and the spark plug, the risk of misfire is greatly reduced. Since the fuel injector is positioned vertically in the center of the combustion chamber, the fuel injector generates a fuel jet which can easily be mixed with air flow during the intake stroke. The present invention also allows for the application of a variety of injection strategies (e.g., fully premixed, partially premixed, stratification) according to engine load. In general, the present invention allows for both a high power density and a stable, efficient combustion at low loads.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:
1. A hydrogen direct injection engine, comprising:
 a cylinder;
 a combustion chamber positioned at a center of the cylinder, the combustion chamber having a domed portion;

one or more intake valves in communication with the combustion chamber;
one or more exhaust valves in communication with the combustion chamber;
a cylinder head mounted across a top surface of the cylinder;
a fuel injector positioned vertically along a central axis of the cylinder;
a piston disposed within the cylinder; and
a spark plug connected to and interfacing with the combustion chamber,
wherein the domed portion of the combustion chamber is recessed within the cylinder head and positioned between the one or more intake valves and the one or more exhaust valves,
wherein the fuel injector comprises an injection tip interfacing the domed portion and positioned at a recessed depth from an upper surface of the domed portion of the combustion chamber.

2. The hydrogen direct injection engine of claim 1, wherein an axis of the combustion chamber is coaxial with the central axis of the cylinder.

3. The hydrogen direct injection engine of claim 1, further comprising two water jackets positioned proximate the spark plug and the injection tip of the fuel injector.

4. The hydrogen direct injection engine of claim 1, wherein the spark plug is flush mounted in the cylinder head such that one or more electrodes included in the spark plug do not protrude into the combustion chamber.

5. The hydrogen direct injection engine of claim 1, wherein the cylinder head has a flat fire deck surrounding the domed portion, and wherein the one or more intake valves and the one or more exhaust valves are arranged within the flat fire deck.

6. The hydrogen direct injection engine of claim 1, wherein the piston has a radius of curvature equal to 5 mm.

7. The hydrogen direct injection engine of claim 1, wherein a squish height of the cylinder may be in a range of 2 mm to 3 mm.

8. The hydrogen direct injection engine of claim 1, wherein the domed portion has a radius of curvature equal to 2 mm.

9. The hydrogen direct injection engine of claim 1, wherein the domed portion comprises:
a height measured as an axial distance between the upper surface of the domed portion and a fire deck portion of the cylinder head surrounding the domed portion; and
a cross-section measured across a base of the domed portion between the fire deck portion.

10. The hydrogen direct injection engine of claim 1, wherein the piston has a recessed area with a depth selected according to a chosen compression ratio.

11. The hydrogen direct injection engine of claim 10, wherein the depth is in a range of 5 mm to 10 mm.

12. The hydrogen direct injection engine of claim 10, wherein the recessed area comprises a first volume recess area and a second volume recess area, wherein the first volume recess area is smaller than the second volume recess area, and wherein the piston is rotationally oriented in the cylinder such that first volume recess area aligns with an exhaust side of the cylinder, and the second volume recess area aligns with an intake side of the cylinder.

13. The hydrogen direct injection engine of claim 1, wherein a volume of the combustion chamber is greater than 50% of a dead volume of the cylinder head.

14. A hydrogen direct injection engine, comprising:
a cylinder;
a cylinder head mounted across a top surface of the cylinder;
a combustion chamber provided in the cylinder,
an intake valve positioned around the cylinder head and interfacing the combustion chamber;
an exhaust valve positioned around the cylinder head and interfacing the combustion chamber;
a domed portion of the combustion chamber recessed within the cylinder head and positioned between the intake valve and the exhaust valve;
a fuel injector positioned vertically along a central axis of the cylinder;
a piston disposed within the cylinder; and
a spark plug interfacing the domed portion of the combustion chamber,
wherein the fuel injector comprises an injection tip interfacing the domed portion and positioned at a recessed depth from an upper surface of the domed portion of the combustion chamber.

15. A method, comprising:
providing a hydrogen direct injection engine,
wherein the hydrogen direct injection engine comprises:
a cylinder,
a cylinder head with a flat fire deck sealing the cylinder,
a domed combustion chamber recessed within a center of the cylinder head and positioned between one or more intake valves and one or more exhaust valves,
a fuel injector positioned at the center of the domed combustion chamber, and
a spark plug flush mounted in the cylinder head,
wherein the fuel injector comprises an injection tip interfacing the domed portion and positioned at a recessed depth from an upper surface of the domed combustion chamber;
injecting, during a compression stroke of the hydrogen direct injection engine, a volume of hydrogen into the domed combustion chamber using the fuel injector after a closure of an intake valve;
mixing a mixture of the volume of hydrogen and air within the domed combustion chamber; and
igniting the mixture using the spark plug.

16. The method of claim 15, further comprising moving a recessed piston head through the domed combustion chamber and inducing free propagation of a flame produced by the spark plug towards a wall of the cylinder.

17. The method of claim 16, further comprising limiting heat losses from the wall of the cylinder.

18. The method of claim 15, further comprising injecting, during an intake stroke of the hydrogen direct injection engine, a second volume of hydrogen into the domed combustion chamber.

* * * * *